United States Patent [19]
Price et al.

[11] Patent Number: 6,005,743
[45] Date of Patent: Dec. 21, 1999

[54] DISK DRIVE WITH MULTIPLE ACTUATORS ON A SINGLE AXIS AND DISK SURFACES OF DIFFERING TRACK PITCH

[75] Inventors: Kirk Barrows Price; Louis Joseph Serrano; Mantle Man-Hon Yu, all of San Jose, Calif.

[73] Assignee: International Business Machines Corporation, Armonk, N.Y.

[21] Appl. No.: 09/073,283

[22] Filed: May 5, 1998

Related U.S. Application Data

[62] Division of application No. 08/795,090, Feb. 5, 1997, Pat. No. 5,761,007.

[51] Int. Cl.[6] .................................................. G11B 5/55
[52] U.S. Cl. .......................................... 360/78.12; 360/75
[58] Field of Search ..................................... 360/75, 77.05, 360/78.12, 48, 69, 77.02, 77.08, 78.04, 106, 109

[56] References Cited

U.S. PATENT DOCUMENTS

| | | |
|---|---|---|
| 4,270,154 | 5/1981 | Crawford . |
| 4,286,298 | 8/1981 | Rinkleib . |
| 4,544,972 | 10/1985 | Kogure et al. . |
| 4,679,103 | 7/1987 | Workman . |
| 5,184,265 | 2/1993 | Foote et al. . |
| 5,268,805 | 12/1993 | Peng et al. . |
| 5,355,486 | 10/1994 | Cornaby . |
| 5,717,549 | 2/1998 | Jurgenson . |

FOREIGN PATENT DOCUMENTS

| | | |
|---|---|---|
| 56-130865 | 10/1981 | Japan . |

*Primary Examiner*—Andrew L. Sniezek
*Assistant Examiner*—James L Habermehl
*Attorney, Agent, or Firm*—Noreen A. Krall

[57] ABSTRACT

A data recording disk file having multiple actuators mounted on a common pivot axis, one of the actuators having fewer arms and lower inertia characteristics than the other. A servo system separately drives each of the actuators for seek repositioning, the lower inertia actuator having a higher performance than the other. A controller selectively records one type of data on the data surfaces associated with the lower inertia actuator, and records all other data on the other data surfaces, thereby providing a disk drive with increased performance appropriate to the data stored on the surfaces associated with the lower inertia actuator. A removable locking pin may be provided which extends through corresponding holes in each of the actuators for maintaining the actuators precisely positioned with respect to each other so that servo information may be written on each of the surfaces in a single process. Additionally, one of the actuators may be provided with a shorter stroke than the other actuators. Further, the tracks of the data surfaces associated with one of the actuators may have a different track pitch than the other data surfaces.

4 Claims, 5 Drawing Sheets

DISK DRIVE WITH MULTIPLE ACTUATORS ON A SINGLE AXIS AND DISK SURFACES OF DIFFERING TRACK PITCH

This is a Divisional application of Ser. No. 08/795,090, filed Feb. 5, 1997 now U.S. Pat. No. 5,761,007.

TECHNICAL FIELD

This invention relates to a magnetic disk drive having a rotary actuator pivot axis, and, more particularly, to a magnetic disk drive having multiple rotary actuators on the single axis.

BACKGROUND OF THE INVENTION

Magnetic hard disk drives comprise the primary means of storing programs and data for modern computer systems, ranging from very high performance "main frame" computer systems, to small "notebook PC's". The disk drives used are always designed to comprise the best compromise between size, performance, capacity and cost for the specific application.

In notebook PC's, the need for a small size is apparent to simply allow all of the components of the computer to fit within the small physical size of the computer. Small size for given performance and capacity has become very important for all other computer systems also, due to the need to conserve the floor space occupied by the computer system.

The rotary actuator disk drive has become the dominant type of magnetic hard disk drive in the industry because of its smaller size for the same capacity, as compared to linear actuator hard disk drives.

Design improvements are constantly being made to rotary actuator disk drives to increase their data capacity without dramatic increases in cost. Examples include the continuing increase in track density and in linear data density by use of ever smaller magnetic heads, such as the change from thin film inductive heads to inductive write and magneto-resistive read heads.

Improvements in track density and linear density provide significant improvements in data capacity for a given disk, but do not provide any improvement in performance, specifically in the ability to access the data on the disk. In fact, the increase in capacity of each disk in a disk drive makes it more difficult to access the data, since the tracks are now closer together and the smaller geometry of the head requires that the servo system be designed to operate the same actuator more precisely than previously. An actual loss in performance comes from the increased "settle time" for the actuator to come to rest over the desired track at the end of a seek. Settle time is not well defined in the art, but essentially includes the time required to bring the head to a stationary position from the seek, including any backwards movement after overshoot.

In the past, attempts have been made to increase the performance of disk drives by adding an additional actuator. The additional actuator has been a duplicate of the first and would access all of the disks of the drive to allow the data to be accessed more quickly by having one actuator seek to new data while the head on the other actuator was reading or writing the previous data. Some examples of identical dual actuators include U.S. Pat. No. 5,341,351, Ng, assigned to the same assignee as the present invention; U.S. Pat. No. 5,355,486, Cornaby, assigned to Conner Peripherals, Inc.; and U.S. Pat. No. 4,270,154, Crawford, unassigned. Japanese patent publication no. 56-130865, Nagai, assigned to Hitachi Seisakusho K.K., appears to illustrate non-identical dual actuators, but does not discuss any difference. Such dual actuators, however, dramatically increase both the cost of the drive and the space requirement for the drive.

The increase in performance by providing dual or duplicated actuators is helpful. However, such dual actuator drives are not being implemented in modern disk drives with any amount of success.

In an attempt to reduce both the cost of the drive and the space requirements, the dual actuators can be mounted on the same pivot axis. One example is U.S. Pat. No. 4,544,972, Kogure et al., assigned to Nippon Telegraph & Telephone Public Corporation. The actuators thus access only separate disk surfaces of the drive but allow use of the same pivot axis and the same back iron for the voice coil motors of the two rotary actuators.

Such an arrangement greatly increases performance with only a small increase in cost. However, such a design still faces an additional challenge posed by modern applications. The conflict is between increasing capacity required by such things as image and video data versus the small record "character" or "text" data, which is best served by a higher performance disk drive.

The dramatically increasing requirements for capacity relates to the increase in image and video data in modern computer systems, as discussed above. Such data has very different characteristics from the programs and the "character" data primarily used in computers of the past. Whereas the programs and "character" data sets of the past utilized short data records, the image and video data are characterized by very large data sets. Such large data sets do not require the constant accessing and performance that the shorter data sets and programs require. The '972 patent, having identical actuators, cannot resolve these conflicting requirements.

Thus, what is needed is a disk drive with high capacity and with the capability of increasing performance appropriate to the data.

SUMMARY OF THE INVENTION

Disclosed is a data recording disk file having at least two actuators mounted on a common pivot axis, one of the actuators having lower inertia characteristics than the other, preferably by having fewer arms. A servo system separately drives each of the actuators for seek repositioning, the lower inertia actuator having a higher performance than the other. A controller selectively records data of a first type on the data surfaces associated with the lower inertia actuator, and records all other data on the other data surfaces, thereby providing a disk drive with high capacity and with increased performance appropriate to the data stored on the surfaces associated with the lower inertia actuator.

A removable locking pin may be provided which extends through corresponding holes in each of the actuators for maintaining the actuators precisely positioned with respect to each other so that servo information may be written on each of the surfaces in a single process.

Additionally, one of the actuators, may be provided with fewer tracks than the other data surfaces, which fewer tracks are positioned towards the center axis of the disk. Further, the track pitch of the data surfaces associated with one of the actuators may be different than the other data surfaces.

For a fuller understanding of the present invention, reference should be made to the following detailed description taken in conjunction with the accompanying drawings.

DETAILED DESCRIPTION OF THE INVENTION

Incorporation by Reference

Coassigned U.S. Pat. No. 4,679,103, Workman, is incorporated by reference herein for the purpose of describing conventional servo systems for magnetic disk files.

Preferred Embodiments

Figure 1:
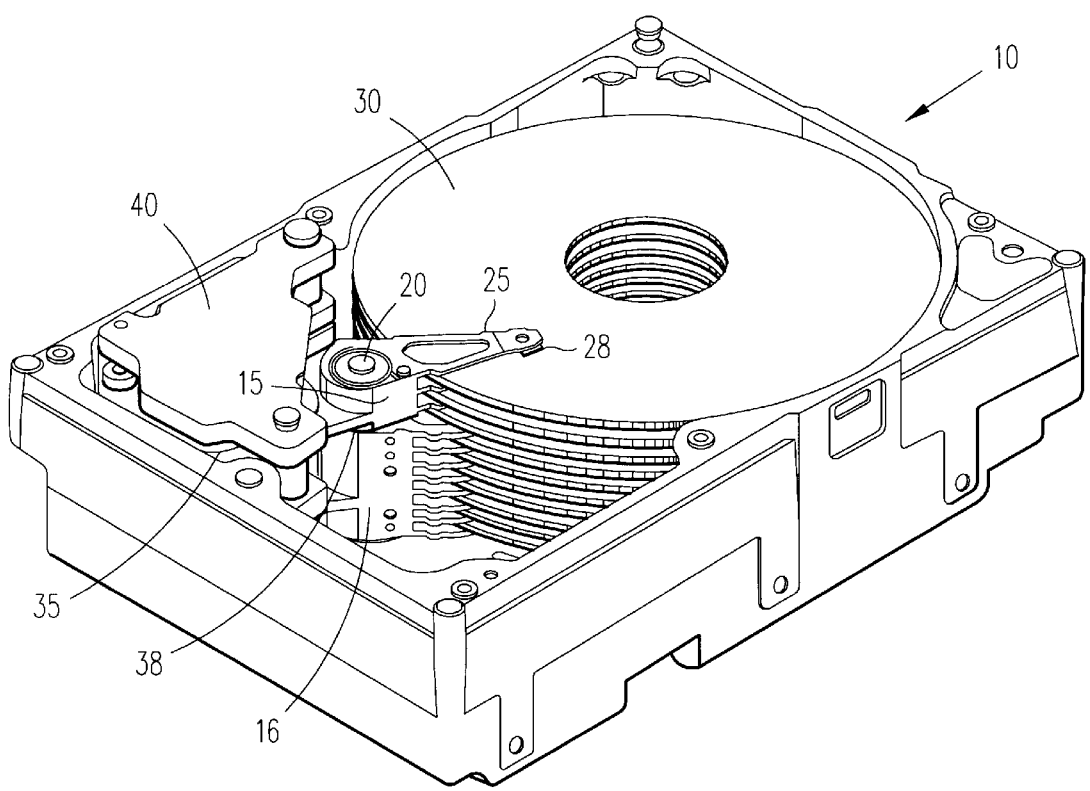
FIG. 1 is a diagrammatic perspective view of a dual actuator disk drive of the present invention.

A preferred embodiment of the present invention is shown in FIG. 1. A disk drive 10 incorporating the present invention is illustrated in a diagrammatic perspective view. Two actuators 15 and 16 are mounted on the same stationary shaft 20 and pivot about the same axis. Each of the actuators has vertically spaced parallel arm assemblies 25, which are of conventional construction. The distal end of each arm includes magnetic head or transducer assemblies 28 for reading or writing data on the adjacent surfaces of magnetic disks 30. The magnetic head assemblies are conventional and are not described in further detail here. Each of the arms 25 that is located between two disks 30 includes two magnetic head assemblies 28, for reading or writing data on, respectively, the surfaces of the disks immediately above and below the arm.

The present invention provides a lesser number of arms 25 with actuator 15 than with actuator 16, whereby actuator 15 has a lower inertia than actuator 16.

Each of the actuators includes a conventional "voice coil motor" having a flat coil 35 mounted on support 38. The flat coil interacts with a magnetic circuit assembly 40, such that a current in the coil causes the actuator to rotate about the axis of shaft 20 to move the associated magnetic heads 28 laterally across the surfaces of the associated magnetic disks 30. A dual magnetic circuit assembly of the type illustrated in FIG. 1 is described in the '972 patent.

The magnetic disks 30 are supported by a conventional spindle (not shown) so as to be spaced apart and parallel to one another. The disks are rotated by a conventional spindle motor (not shown) so that the magnetic heads 28 trace concentric data tracks on the corresponding surfaces of the associated disks 30. The arms of each actuator are stacked in the form of a "comb" and are moved together so that the set of tracks traced by the set of magnetic heads on the arms form a vertical "cylinder".

Each of the tracks includes prerecorded servo information in sectors interspersed among the data on each disk surface.

Figure 2:
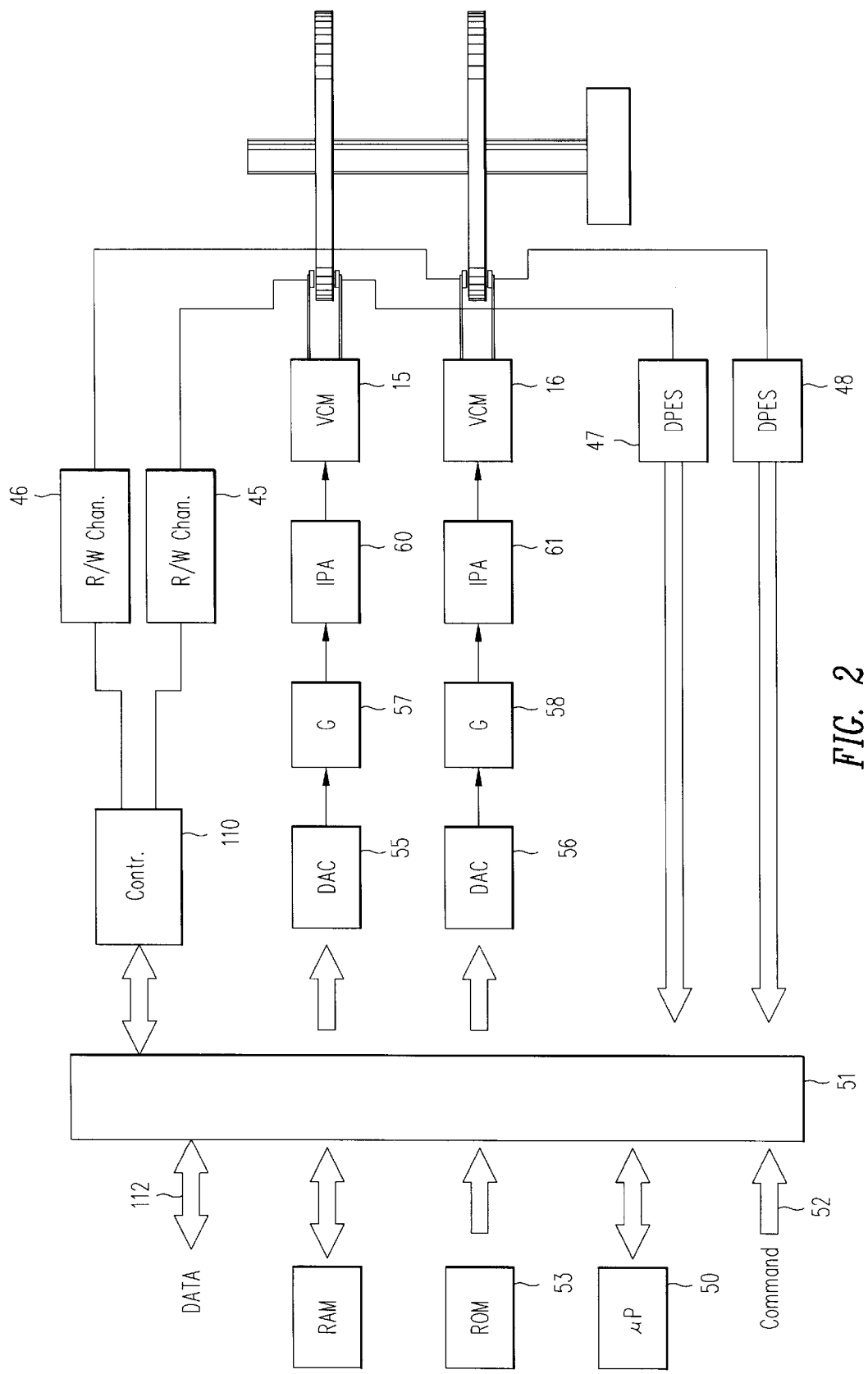
FIG. 2 is a block diagram of the servo systems and data handling systems of the present invention for the disk drive of FIG. 1.

Reference is now made to FIG. 2 which is a block diagram of the servo systems and data handling systems of the present invention for the disk drive of FIG. 1.

Each of the magnetic heads on actuator 15 is connected both to conventional read/write channel 45 and to conventional digital position error signal decoding circuitry 47. Similarly, each of the magnetic heads on actuator 16 is connected both to conventional read/write channel 46 and to conventional digital position error signal decoding circuitry 48.

Digital position error signal decoding circuitry 47 and 48 each comprise part of a conventional digital servo control system such as that described in the '103 patent. Specifically, the servo information sensed by the magnetic head at discrete sample times, is demodulated to generate a digital position error signal (DPES) which is an indication of the position error of the head away from the nearest track centerline. The DPES is supplied to microprocessor 50 on bus 51 and is used by the microprocessor to compute the absolute head position. During track seeking, when the head is moving across the tracks, the microprocessor uses the DPES samples and a signal representing the desired or target track supplied at command input 52 to generate a total error signal. The total error signal is equal to the difference between the position of the target track and the demodulated position error signal. The microprocessor also uses the position samples and samples of the current to estimate the velocity of the head. A digital velocity trajectory is generated from data stored in ROM 53 and provides a value representative of the optimum velocity of the head as a function of the total error signal. A velocity error is then computed as the difference between the computed estimate of head velocity and the optimum velocity from the velocity trajectory generator.

As will be explained, a different velocity trajectory will be generated for each of the actuators 15 and 16, due to the differences in inertia of the actuators.

Referring still to FIG. 2, with further reference to the '103 patent, the estimated velocity error is used to form a digital control signal which is provided to the appropriate DAC (digital to analog converter) 55 or 56. The converted analog signal is compensated for various offsets and bias forces of the respective actuator by compensator gain circuit 57 or 58 supplied to integrating power amplifier (IPA) 59 or 60. As described in the '103 patent, the compensation may also be provided digitally. The compensated control signal is integrated and amplified at the IPA to generate a control current to the appropriate VCM 15 or 16. The control current is a specific current level to move the coil so that the corresponding head is moved with the desired velocity toward the centerline of the desired track.

As discussed with reference to FIG. 1, actuator 15 is provided with a lesser number of arms than is actuator 16. As the result, actuator 15 has lower inertia than does actuator 16. With reference to FIG. 2, the same level of current provided by IPA 60 as that of IPA 61 will therefore accelerate actuator 15 faster than IPA 61 will accelerate actuator 16. Thus, a different velocity trajectory must be generated for each of the actuators 15 and 16 so as to provide the appropriate IPA 60 and 61 with an optimized control.

The lower inertia of actuator 15 allows a velocity trajectory to be used which provides a significantly higher seek performance (lower seek time) between tracks. The servo designs are made accordingly.

Briefly, and with reference to the '103 patent, servo design is a trade off between issues of performance and robustness, with the two often conflicting with each other. One measure of a servo system is its bandwidth, or put in more general language, how well the servo system can track a command input. If the servo system has relatively low bandwidth, then it will be unable to track a moderate frequency command well. Another way of looking at the concept is that a low bandwidth servo will return to track center more slowly than a higher bandwidth servo. This is a disadvantage when it is the track itself that is moving, either from servo write problems, such as disk spindle tilt, or from external vibration. A typical low bandwidth is 400 Hertz. A typical high bandwidth is around 600 Hertz.

A second measure of a servo system is the gain margin. Again, using more general language, this is the amount the gain of the system can be wrong before loss of control results. Gain margin is a measure of the robustness of the servo system. The gain margin allows for variation between "plants", or the servo and actuator systems of different drives. In the mass production environment, it is not possible to economically provide a specialized servo design for every individual drive. Thus, a reasonable variation between drives must be allowed. Gain margin also allows for variation of a single plant across various frequencies. A third, similar, measure is the phase margin. It specifies by how much the system's phase can change before loss of control results. Gain margin of 8 db is good, as is a phase margin of 45 degrees.

Usually, increasing the bandwidth of a well designed servo system decreases the gain and phase margin, forcing a design trade-off between performance and robustness. Part of the art of servo design is to strike the right trade-off.

Put differently, a low control will not excite the resonant vibrations of the mechanics very much, and a higher control is likely to increase the vibrations and to increase the "settle time" of the head before it comes to rest at the centerline of the desired track. Specifically, the energy put into a seek, both for initial acceleration and then for deceleration, creates resonant vibrations of the mechanical parts. The vibrations and deceleration energy typically result in overshoot of the target track and in oscillation of the head about the target track before the head comes to rest directly over the target track. The oscillations decay exponentially and the time required for the head to come to rest is called the "settle time".

Hence, in the dual actuator system of the present invention, where the actuators have different inertia, the servo designer may utilize the low inertia of the one actuator to increase the performance or robustness of the actuator, or both. The servo system for the low inertia actuator may be designed to operate at a higher bandwidth to attain higher performance, may be designed to operate with a small control to attain more robustness, or may be designed to operate at some intermediate point to attain both increased performance and increased robustness as compared to the larger actuator.

As is well understood by those of skill in the art, the specific velocity profile design is dependent upon the characteristics of the actuator, and specific details of establishing the profiles need not be discussed here. For additional information, the '103 patent may be consulted.

Figure 3:
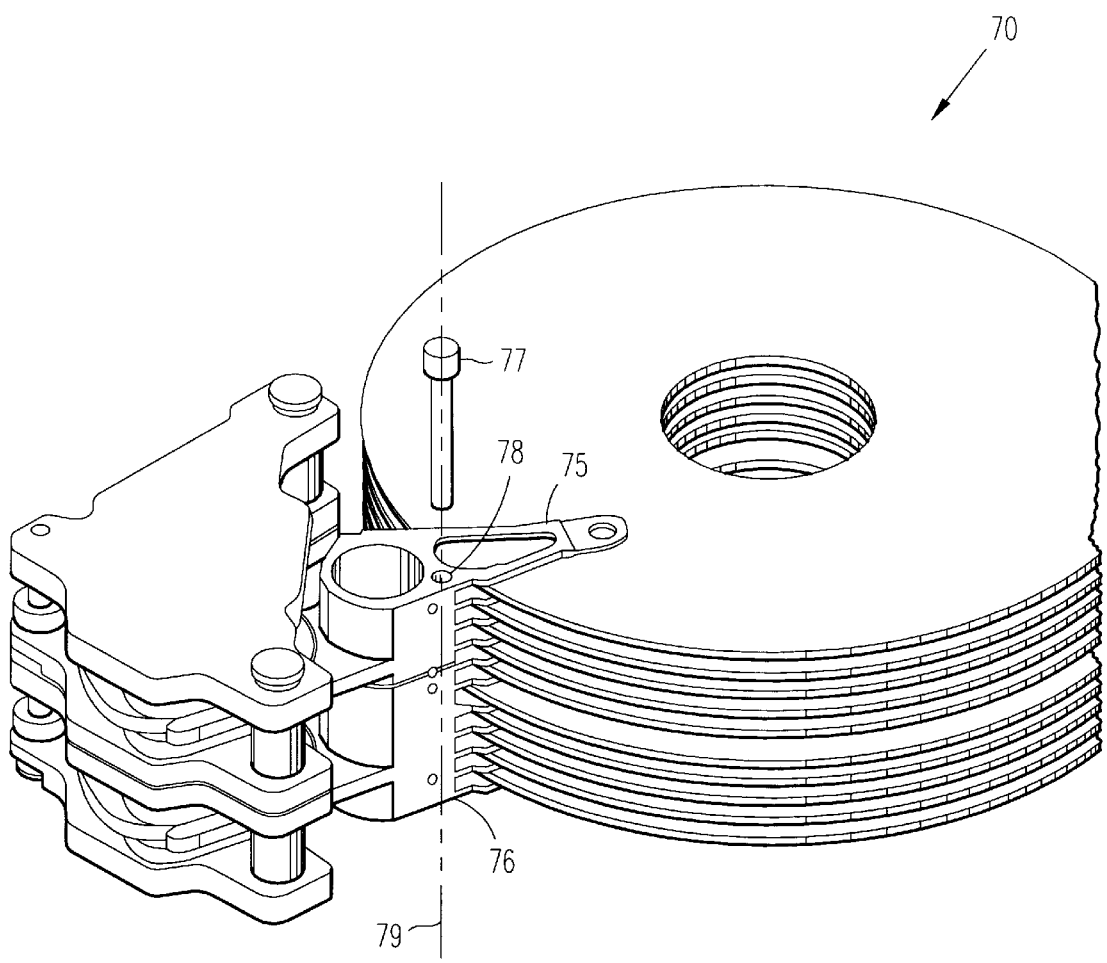
FIG. 3 is a diagrammatic perspective view of another embodiment of a dual actuator disk drive and of a locking pin of the present invention.

FIG. 3 is a diagrammatic perspective view of another embodiment of a dual actuator disk drive 70 having actuators 75 and 76. Actuator 75 has a lesser number of arms than does actuator 76 and is therefore a lower inertia actuator.

Also shown is a locking pin 77 which is inserted into hole 78 after the actuators have been aligned along axis 79. The locking pin is to be used when the drive is manufactured to precisely lock the two actuators together so that they rotate together. A conventional servowriter may then be used to write servo sectors on the tracks of the disk surfaces associated with actuator 76 and on the tracks of the disk surfaces associated with actuator 75.

Figure 4A:
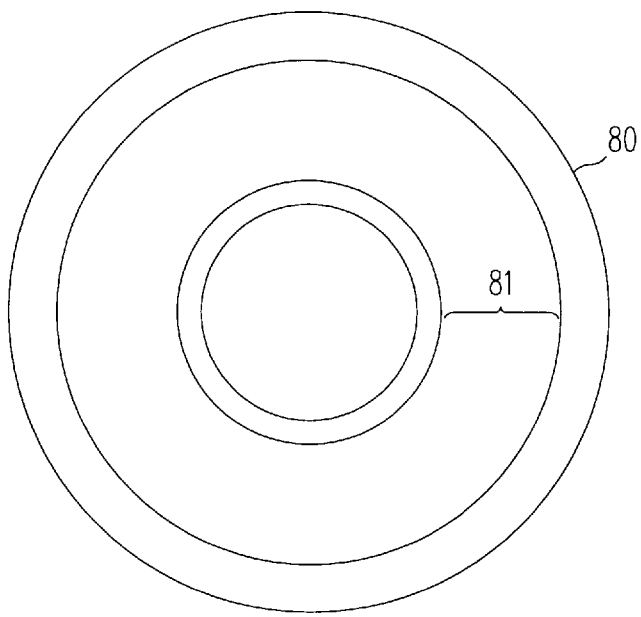
FIGS. 4A and 4B are diagrammatic top views of disks of the disk drives of FIGS. 1 and 3 illustrating different numbers of tracks in accordance with another aspect of the present invention.
Figure 4B:
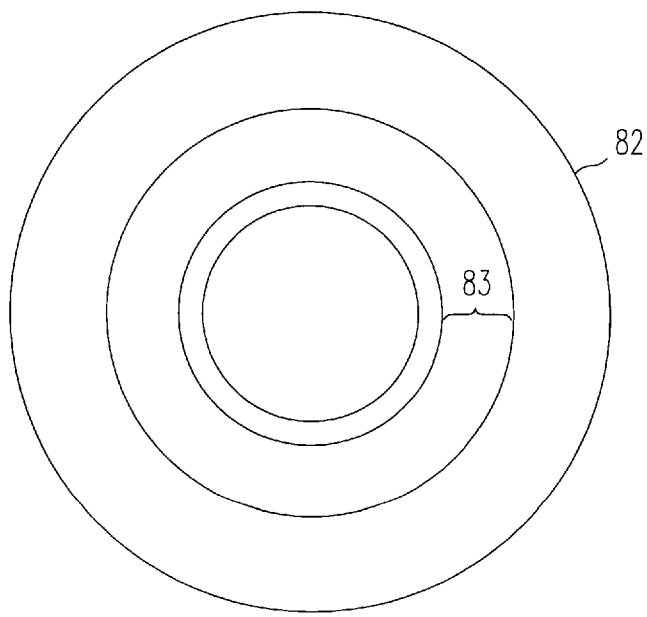

FIGS. 4A and 4B are diagrammatic top views of disks of the disk drives of FIGS. 1 and 3 illustrating an alternative embodiment thereof. Specifically, in the embodiment of FIGS. 4A and 4B, the two actuators are provided with different stroke lengths, or maximum length of movement of the actuator.

Disk 80 in FIG. 4A comprises a surface of a disk which is associated with actuator 16 in FIG. 1, and with actuator 76 in FIG. 3, and comprises a standard stroke length 81.

The seek performance of an actuator is directly related to the stroke length of the actuator. Thus, disk 82 in FIG. 4B illustrates a shorter stroke length 83 which is preferably associated with high performance actuator 15 in FIG. 1 and with high performance actuator 75 in FIG. 3. The short stroke length over which the actuator 15 or 75 is required to seek significantly increases the performance of the actuator.

In reducing the stroke of the actuator, the inner track area is used for the tracks so as to avoid the outer bands of the disks, which can have greater flutter than the interior bands of the disks. The flutter increases the probability of data error and therefore requires a more robust servo. This added robustness is achieved with a longer settle time further down the exponential decay curve of the vibrations, as discussed above. Thus, by providing the shorter stroke 83 toward the center axis of the disk, a shorter settle time servo velocity profile may also be provided, further increasing the performance of the associated actuator 15 or 75.

Alternatively, the lower performance actuator is provided with the shorter stroke to avoid a longer settle time at higher track pitches, as will be explained.

Figure 5:
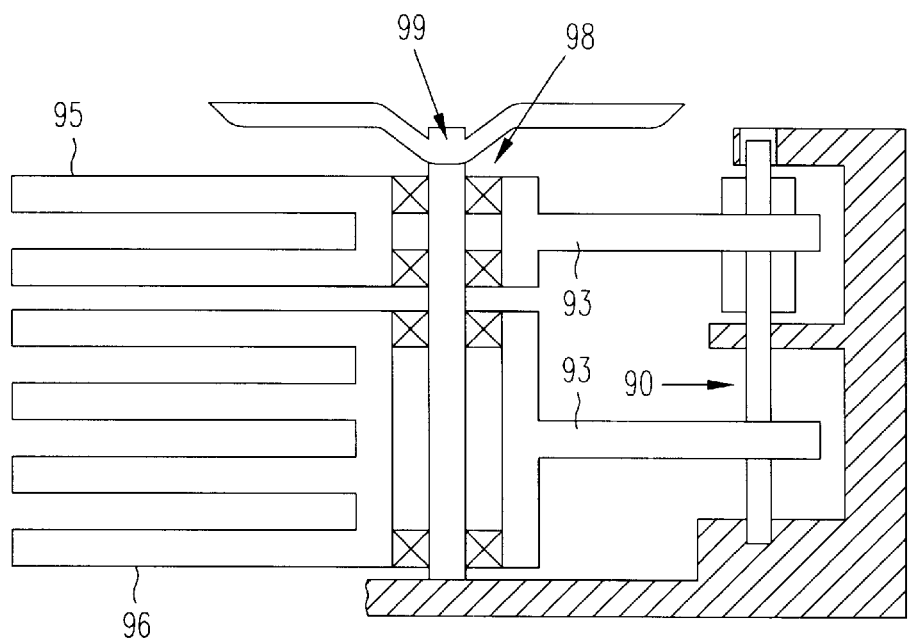
FIG. 5 is a cross sectional view of another embodiment of a dual actuator disk drive of the present invention.
Figure 6:
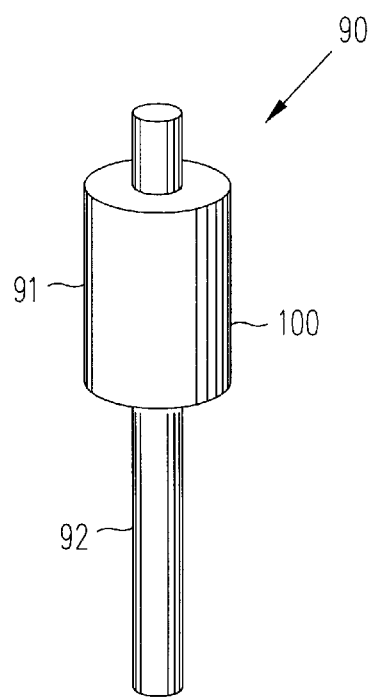
FIG. 6 is a perspective view of a dual crash stop in accordance with another aspect of the present invention.

FIG. 5 is a cross sectional view of another embodiment of a dual actuator disk drive of the present invention, and which uses the different stroke lengths of FIG. 4, additionally showing a dual crash stop 90. FIG. 6 is a perspective view of the dual crash stop 90 of FIG. 5.

A crash stop prevents an actuator from moving beyond the limits of the tracks on the disk surface as the result of external shock or loss of control. Referring to FIGS. 5 and 6, the crash stop 90 is preferably a plastic pin which provides strike zones for coil arms 93 of actuators 95 and 96, respectively. The crash stop is inserted in the base casting 97 of the disk file.

In the cross sectional view of the disk file of FIG. 5, actuators 95 and 96 are supported for rotation by bearings 98 about common shaft 99.

Actuator 95 has a lesser number of arms than does actuator 96 and therefore has a lower inertia, and is capable of higher performance. Actuator 96 is associated with the surface of disk 80 in FIG. 4A having the normal stroke length 81. Actuator 95 is associated with the surface of disk 82 in FIG. 4B having the shorter stroke length 83, allowing for a shorter stroke of the actuator. Therefore, the wider strike zone 91 is provided for the more limited stroke of actuator 95. As the actuator is also the high performance, and therefore the "fast" actuator, the strike zone 91 may be provided by an elastomeric sleeve 100, which has greater resilience than the plastic pin.

Alternatively, a resilient smaller sleeve may be provided for the greater inertia actuator 96. As still another alternative, resilient sleeves may be provided for strike zones for both the "fast" actuator 95 and the greater inertia actuator 96.

The servowriting of the disks, if done as discussed above, is conducted before the crash stop is installed. Alternatively, the locking pin 77 of FIG. 3 is not used and the actuators are servowritten separately.

Another embodiment of the present invention is that the tracks for the high performance actuator are at a wider track pitch than that for the normal actuator. The wider track pitch requires a concomitant wider head geometry, providing wider tracks as well. The wider track pitch decreases the settle time, since the distance between tracks is greater and, as described, the tracks are also wider. The greater distances allow the head to read or write at an earlier point along the exponential decay curve, as discussed above. The resultant decrease in settle time further increases the performance (reduces the seek time) of the high performance actuator. The locked servowriting discussed with respect to FIG. 2, is conducted by stepping the actuator different distances for the different surfaces.

Referring again to FIG. 2, a data controller 110 is provided, which may implemented in microprocessor 50, but which is shown separately for ease of description. Controller 110 switches the data path from data bus 112 between read/write channel 46 and read/write channel 45, in response to commands appearing on command bus 52.

Thus, data best suited for access by normal actuator 16 is provided on read/write channel 46, and data best suited for access by high performance actuator 15 is provided on read/write channel 45.

Alternatively, a single read/write channel may be used and switched back and forth as is conventionally done for prior disk files having identical actuators at either side of the disks to separately access the same data on all disk surfaces, discussed above.

The dual actuators having different inertias of the present invention allow the drive and servo designers with a great deal of flexibility in the space of a single actuator drive. The low inertia actuator may provide higher velocity, higher performance seeks, or a very robust servo, or a combination thereof. Either actuator may be provided with a shorter stroke to increase the performance or robustness thereof. The track pitches may also be different to change the relative capacities and performance or robustness.

The high performance actuator may be considered as equivalent to a cache and contain data or programming that is accessed very often. Examples include the operating system for the host computer system and data records that are small and require fast access, such as for transaction processing.

The normal actuator is best suited for data that is accessed less frequently. Examples include sequential data used for payroll or accounting, or very long data records, such as video.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data recording disk file comprising:

at least one rotatable disk having a data surface on each of two opposite sides thereof, each said data surface having generally concentric data tracks and servo information recorded thereon, at least one of said data surfaces having said data tracks at a farther track pitch, providing a greater separation between said data tracks, than the other of said data surfaces;

at least two actuators mounted on a common pivot axis, each actuator having at least one head arm assembly with a magnetic head mounted at one end thereof for reading said data tracks and/or writing on said data tracks of a corresponding data surface, one of said actuators associated with said at least one data surface having said data tracks at said farther track pitch; and a servo system for separately driving each of said actuators for seek repositioning said magnetic head thereof from one data track to a target data track of said corresponding data surface and for maintaining said magnetic head aligned with a data track.

2. The data recording disk file of claim 1, additionally comprising:

a controller for selectively recording data of a first type on said at least one of said data surfaces having said farther track pitch, and for recording all other data on other of said data surfaces.

3. The data recording disk file of claim 1, additionally comprising:

a removable locking pin extending through corresponding holes in each of said actuators for maintaining said actuators precisely positioned with respect to each other, whereby servo information may be written thereby on each of said surfaces in a single process.

4. The data recording disk file of claim 1, wherein:

one of said actuators has a lesser number of said head arm assemblies than the other; whereby said one actuator has lower inertia characteristics than the other of said actuators.

* * * * *